United States Patent
Park et al.

(10) Patent No.: US 8,644,270 B2
(45) Date of Patent: Feb. 4, 2014

(54) METHOD AND SYSTEM FOR CONFIGURING A FRAME IN A COMMUNICATION SYSTEM

(75) Inventors: Jeong-Ho Park, Seoul (KR); Kwan-Hee Roh, Hwaseong-si (KR); Jae-Hee Cho, Seoul (KR); Tae-Young Kim, Seongnam-si (KR); Jin-Kyu Koo, Suwon-si (KR); Dong-Seek Park, Yongin-si (KR); Ho-Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1143 days.

(21) Appl. No.: 12/035,656

(22) Filed: Feb. 22, 2008

(65) Prior Publication Data

US 2008/0205364 A1      Aug. 28, 2008

(30) Foreign Application Priority Data

Feb. 22, 2007   (KR) .................. 10-2007-0017906

(51) Int. Cl.
*H04W 4/00*      (2009.01)

(52) U.S. Cl.
USPC ........... 370/338; 370/204; 370/208; 370/319; 370/322; 370/329; 370/341; 370/470; 370/478

(58) Field of Classification Search
USPC ................ 370/338, 203, 208; 455/68–70, 73; 375/260
See application file for complete search history.

(56) References Cited

U.S. PATENT DOCUMENTS 5,010,330 A     4/1991  Snowden et al.
5,506,837 A *  4/1996  Sollner et al. ................. 370/296

(Continued)

FOREIGN PATENT DOCUMENTS

JP      2003-513592 A     4/2003
JP      2003-524985 A     8/2003

(Continued)

OTHER PUBLICATIONS

Jaeweon Cho, Mihyun Lee, Hokyu Choi, Jaehee Cho, DS Park, Heewon Kang, Yungsoo Kim, Soonyoung Yoon, IEEE 802.16 M frame Structure, IEEE S802.16m-08/062r1, Jan. 20, 2008.*

(Continued)

*Primary Examiner* — Ian N Moore
*Assistant Examiner* — Dung B Huynh
(74) *Attorney, Agent, or Firm* — Jefferson IP Law, LLP

(57) ABSTRACT

A method and system for configuring a frame in a communication system is provided. The method includes determining a number of frames for configuring one multi-frame, wherein the number is at least two, and configuring each of the determined number of frames, wherein the determined number of frames include a first frame and a second frame temporally discriminated from each other, each of the determined number of frames includes a downlink sub-frame and an uplink sub-frame, a downlink sub-frame of the first frame includes a first area for transmitting a reference signal used for an acquisition of synchronization between a base station and a mobile station, a second area including system information and common control information related to the multi-frame, a third area including modulation scheme information and allocation information of data bursts, a fourth area to which a downlink data burst is allocated in a diversity mode and a fifth area to which a downlink data burst is allocated in a band Adaptive Modulation and Coding (AMC) mode, and a downlink sub-frame of the second frame includes a sixth area including modulation scheme information and allocation information of data bursts, a seventh area to which a data burst is allocated in a diversity mode, and an eighth area to which a data burst is allocated in an AMC mode.

24 Claims, 8 Drawing Sheets

(56) References Cited

U.S. PATENT DOCUMENTS

| | | | |
|---|---|---|---|
| 5,513,297 A * | 4/1996 | Kleijn et al. | 704/223 |
| 6,683,866 B1 | 1/2004 | Stanwood et al. | |
| 7,864,725 B2 * | 1/2011 | Li et al. | 370/328 |
| 2001/0033560 A1 * | 10/2001 | Tong et al. | 370/337 |
| 2003/0076812 A1 | 4/2003 | Benedittis | |
| 2005/0195909 A1 * | 9/2005 | Hwang et al. | 375/260 |
| 2005/0201269 A1 * | 9/2005 | Shim et al. | 370/208 |
| 2005/0202822 A1 * | 9/2005 | Park et al. | 455/436 |
| 2006/0268983 A1 * | 11/2006 | Kwon et al. | 375/240.11 |
| 2007/0002958 A1 * | 1/2007 | Chang et al. | 375/260 |
| 2007/0115862 A1 * | 5/2007 | Lee et al. | 370/260 |
| 2008/0056390 A1 * | 3/2008 | Rainbolt et al. | 375/260 |
| 2008/0075032 A1 * | 3/2008 | Balachandran et al. | 370/317 |
| 2008/0107047 A1 * | 5/2008 | Olfat | 370/280 |
| 2008/0144612 A1 * | 6/2008 | Honkasalo et al. | 370/370 |
| 2009/0316614 A1 * | 12/2009 | Kim et al. | 370/312 |
| 2010/0226333 A1 | 9/2010 | Cho et al. | |

FOREIGN PATENT DOCUMENTS

| | | | |
|---|---|---|---|
| JP | 2007-006503 A | 1/2007 | |
| JP | 2008-522542 A | 6/2008 | |
| WO | 2005/039127 A1 | 4/2005 | |
| WO | 2005/088869 A1 | 9/2005 | |
| WO | 2005/088870 A1 | 9/2005 | |
| WO | 2006/051372 A1 | 5/2006 | |
| WO | 2006/069399 A2 | 6/2006 | |
| WO | 2006/075870 A1 | 7/2006 | |
| WO | 2006/105005 A2 | 10/2006 | |

OTHER PUBLICATIONS

Jeffrey Z. Tao, Koon Hoo Teo, Jinyun Zhang, An Adaptive Frame Structure for OFDMA-based Mobile Multihop Relay Networks, IEEE S802.16 j-07/117r1, Jan. 15. 2007.*

D.H. Ahn, Junhong Hui, Young-il Kim, C.I.Yeh, Multi-frame structure consistent to 802.16e for MR Networks,IEEE C802.16j-07/162r5, Jul. 6, 2007.*

Chae C B et al., KR 2006016466 A, "Method for Constructing a Map Message for Hybridautomatic Repeat Request Transmission and Allocatingautomatic Repeat Request in a Broadband Wirelessaccess System Using Multiple Antenna", date Feb. 22, 2006.*

"Part 16: Air Interface for Fixed and Mobile Broadband Wireless Access Systems", 802.16e-2005, pp. 94-95.*

* cited by examiner

METHOD AND SYSTEM FOR CONFIGURING A FRAME IN A COMMUNICATION SYSTEM

PRIORITY

This application claims the benefit under 35 U.S.C. §119(a) of a Korean patent application filed in the Korean Intellectual Property Office on Feb. 22, 2007 and assigned Serial No. 2007-17906, the entire disclosure of which is hereby incorporated by reference.

BACKGROUND OF THE INVENTION

1. Field of the Invention

The present invention relates to a communication system. More particularly, the present invention relates to a method and a system for configuring a frame in a communication system.

2. Description of the Related Art

Next generation communication systems are being developed that are capable of guaranteeing the mobility and Quality of Service (QoS) for Broadband Wireless Access (BWA) communication systems, such as a Wireless Local Area Network (WLAN) system and a Wireless Metropolitan Area Network (WMAN) system. An example of such communication systems includes an Institute of Electrical and Electronics Engineers (IEEE) 802.16e communication system.

The IEEE 802.16e communication system is a communication system employing an Orthogonal Frequency Division Multiplexing (OFDM)/Orthogonal Frequency Division Multiple Access (OFDMA) scheme in order to support a broadband transmission network for a physical channel of the wireless MAN system.

Further, the IEEE 802.16e communication system uses a time division multiple transmission scheme in order to support various transmission methods. The time division multiple transmission scheme transmits a preamble at each frame, which enables a user to access the system with minimum delay at an initial access stage. Further, the time division multiple transmission scheme can support an optimum transmission scheme for a given situation of a user through various services divided by time.

FIG. 1 illustrates a structure of a frame in a conventional communication system. The example shown in FIG. 1 corresponds to a Time Division Duplex (TDD) frame structure.

Referring to FIG. 1, the frame includes a downlink (DL) sub-frame 100 and an uplink (UL) sub-frame 150. The DL sub-frame 100 includes a preamble area 110, a Frame Control Header (FCH) area 120, a MAP area (i.e. DL-MAP/UL-MAP area) 130 and DL burst areas 140-1 to 140-5. The UL sub-frame 150 includes a UL control area 160 and UL burst areas 170-1 to 170-3.

Within the preamble area 110, a preamble signal is transmitted for synchronization between a signal transmission apparatus (e.g. a base station) and signal reception apparatuses (e.g. mobile stations). The FCH area 120 carries an FCH, which includes information on a length of the MAP area and a modulation scheme applied to the MAP area.

In the DL-MAP/UL-MAP area 130 a DL-MAP message and a UL-MAP message is transmitted, which include information on whether there are DL burst areas and UL burst areas allocated to each mobile station, and information on locations and modulation scheme applied to the DL burst areas and UL burst areas when there are DL burst areas and UL burst areas allocated to each mobile station. Since it is required that all mobile stations be able to receive the DL-MAP message and UL-MAP message, the DL-MAP message and UL-MAP message are transmitted after being modulated and encoded in accordance with the most robust Modulation and Coding Scheme (MCS) level from among MCS levels usable in the communication system.

Further, a Transmit/Receive Transition Gap (TTG) 180, which is a guard region, is inserted between the DL sub-frame and the UL sub-frame, and a Receive/Transmit Transition Gap (RTG) 190 is inserted between frames.

FIG. 2 illustrates a structure of a frame supporting various transmission methods in a conventional communication system. The example shown in FIG. 2 corresponds to a frame structure used for sequentially transmitting a plurality of zones according to a time division multiplexing scheme.

Referring to FIG. 2, the frame includes a plurality of zones. Specifically, the frame includes a preamble zone 210, a Partial Usage of Sub-channels (PUSC) zone 220, a Full Usage of Sub-channels (FUSC) zone 230, a Tile Usage of Sub-channels (TUSC) zone 240, a band Adaptive Modulation and Coding (AMC) zone 250, and an Adaptive Antenna System (AAS) zone 260.

The PUSC zone 220 to the AAS zone 260 are discriminated from each other according to the sub-channel allocation scheme of the frame, and information related to the zones is transmitted in the MAP area within the DL frame 100 of FIG. 1.

As described above, in the conventional structures, the base station transmits a preamble at each frame and supports multiple transmission schemes according to a time division multiplexing scheme. Therefore, the conventional structures inevitably have an increased MAP size and increased system overhead.

SUMMARY OF THE INVENTION

An aspect of the present invention is to address at least the above-mentioned problems and/or disadvantages and to provide at least the advantages described below. Accordingly, an aspect of the present invention is to provide a method and system for configuring a frame in a communication system.

Another aspect of the present invention is to provide a method and system for configuring a frame, which can support various transmission schemes in a communication system.

Yet another aspect of the present invention is to provide a method and system for configuring a frame, which can reduce system overhead in a communication system.

In accordance with an aspect of the present invention, a method for multi-frame configuration in a communication system is provided. The method includes determining a number of frames for configuring one multi-frame, wherein the number is at least two, and configuring frames according to the determined number of frames, wherein a first frame is temporally discriminated from a second frame, each frame includes a downlink sub-frame and an uplink sub-frame, a downlink sub-frame of the first frame includes a first area for transmitting a reference signal used for an acquisition of synchronization between a base station and a mobile station, a second area including system information and common control information related to the multi-frame, a third area including modulation scheme information and allocation information of data bursts, a fourth area to which a downlink data burst is allocated in a diversity mode and a fifth area to which a downlink data burst is allocated in a band Adaptive Modulation and Coding (AMC) mode, and a downlink sub-frame of the second frame includes a sixth area including modulation scheme information and allocation information of data bursts, a seventh area to which a data burst is allocated in a diversity mode, and an eighth area to which a data burst is allocated in an AMC mode.

In accordance with another aspect of the present invention, a communication system is provided. The communication system includes a base station for determining a number of frames to configure one multi-frame, and for configuring according to the determined number of frames, wherein the determined number is at least two, a first frame is temporally discriminated from a second frame, each frame includes a downlink sub-frame and an uplink sub-frame, a downlink sub-frame of the first frame comprises a first area for transmitting a reference signal used for an acquisition of synchronization between the base station and a mobile station, a second area including system information and common control information related to the multi-frame, a third area including modulation scheme information and allocation information of data bursts, a fourth area to which a downlink data burst is allocated in a diversity mode and a fifth area to which a downlink data burst is allocated in a band AMC mode, and a downlink sub-frame of the second frame includes a sixth area including modulation scheme information and allocation information of data bursts, a seventh area to which a data burst is allocated in a diversity mode, and an eighth area to which a data burst is allocated in an AMC mode.

In accordance with another aspect of the present invention, a method for transmitting a signal according to frame configuration by a base station in a communication system is provided. The method includes transmitting a preamble signal by using a resource of a first area, wherein a multi-frame includes at least two frames, each of which includes a downlink sub-frame and an uplink sub-frame, the downlink sub-frame includes the first area, a second area, a third area, and a fourth area, and the uplink sub-frame includes a fifth area and a sixth area, transmitting common control information related to the multi-frame by using a resource of the second area, transmitting at least one downlink data burst in a diversity mode by using a resource of the third area, transmitting at least one downlink data burst in a band AMC mode by using a resource of the fourth area, appointing at least one uplink data burst to be transmitted by a mobile station in the diversity mode by using a resource of the fifth area, and appointing at least one uplink data burst to be transmitted by the mobile station in the band AMC mode by using a resource of the sixth area.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a method and system for frame configuration, which can reduce system overhead while supporting various transmission techniques in a communication system. An exemplary embodiment of the present invention described below proposes a multi-frame structure. In other words, exemplary embodiments of the present invention propose a method and system for frame configuration, which reduces overhead of a preamble area and transmits a MAP according to a Frequency Division Multiplex (FDM) scheme, thereby reducing overhead for the entire system.

Further, exemplary embodiments of the present invention propose a method and system for frame configuration, which configures burst areas within the frame as a single zone and can support various transmission schemes. For convenience, the following description of exemplary embodiments of the present invention is based on an IEEE 802.16 communication system. However, the method and system for frame configuration proposed by exemplary embodiments of the present invention are equally applicable to other communication systems.

Further, a multi-frame structure proposed by exemplary embodiments of the present invention includes at least two frames, each of which has a length of substantially one of 2.5 ms and 5 ms.

Figure 1:
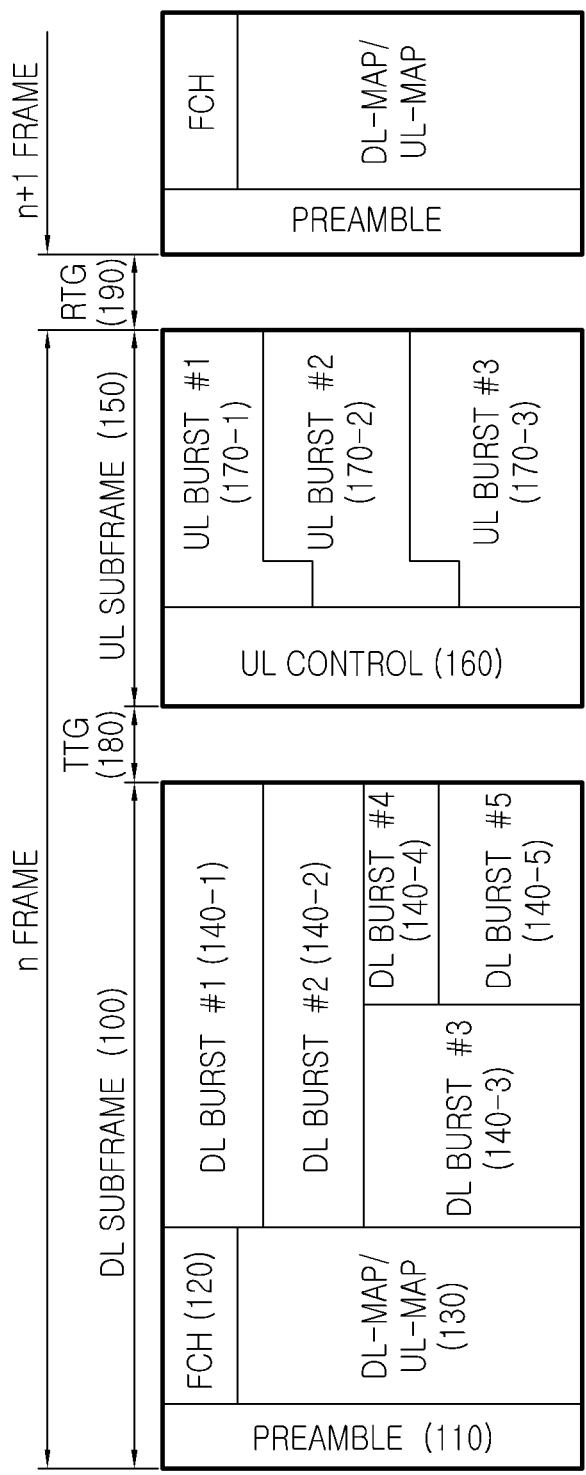
FIG. 1 illustrates a structure of a frame in a conventional communication system.
Figure 2:
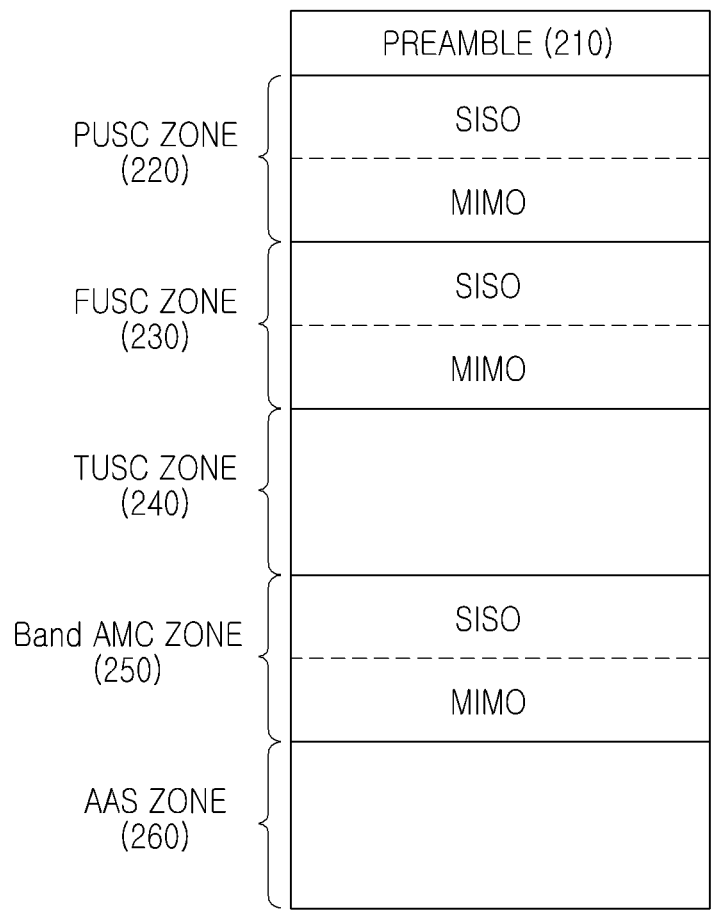
FIG. 2 illustrates a structure of a frame supporting various transmission methods in a conventional communication system.
Figure 3:
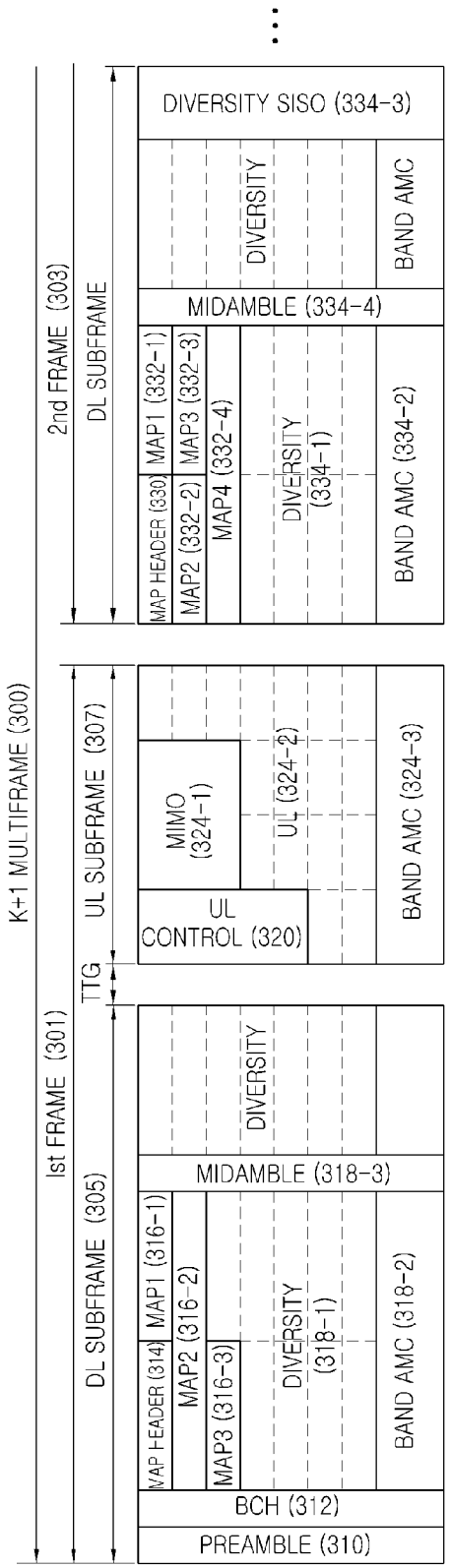
FIG. 3 illustrates a structure of a frame in a communication system according to an exemplary embodiment of the present invention.

FIG. 3 illustrates a structure of a frame in a communication system according to an exemplary embodiment of the present invention.

It is noted from FIG. 3 that the frame has a structure of a multi-frame 300, which includes multiple frames, the number of which changes according to the length of each of the multiple frames. In other words, the multi-frame 300 includes eight frames, each of which has a length of substantially 2.5 ms, or four frames, each of which has a length of substantially 5 ms. The following discussion is based on an example in which each frame of the multi-frame 300 has a length of substantially 5 ms.

The first frame 301 includes a downlink (DL) sub-frame 305 and an uplink (UL) sub-frame 307.

The DL sub-frame 305 includes a preamble area 310, a Broadcasting Channel (BCH) area 312, a MAP header area 314, a plurality of MAP areas 316-1, 316-2, and 316-3 and DL burst areas 318-1 to 318-3. The DL burst areas 318-1 to 318-3 include a DL burst area 318-1 allocated for a diversity mode, a DL burst area 318-2 allocated for a band AMC mode, and a Multiple Input Multiple Output (MIMO) mid-amble area 318-3.

The UL sub-frame 307 includes a UL control area 320 and UL burst areas 324-1, 324-2 and 324-3. The UL burst areas 324-1, 324-2 and 324-3 include a UL burst area 324-1 allocated for a MIMO mode, a typical UL burst area 324-2, and a UL burst area 324-3 allocated for a band AMC mode.

In the preamble area 310 of the DL sub-frame 305 a preamble signal is transmitted for the acquisition of synchronization between a signal transmission apparatus (e.g. a base station) and signal reception apparatuses (e.g. mobile stations). Further, the contents of preamble area 310 are transmitted only once for each multi-frame 300. The BCH area 312 includes system information and multi-frame information and supports a coding rate of 1/12 and sector scrambling in order to secure coverage. The multi-frame information refers to broadcast control information that is to be commonly received by all mobile stations.

The MAP header area 314 and the MAP areas 316-1, 316-2 and 316-3 may be located in each of the eight symbol periods and are discriminated by using FDM. Further, the MAP header area 314 includes MAP size information and Modulation and Coding Scheme (MCS) information of the MAPs. Further, the MAP areas 316-1, 316-2, and 316-3 can be set to have different MCS levels and power boosting levels.

The DL burst areas include the DL burst area 318-1 allocated for a diversity mode, the DL burst area 318-2 allocated for a band AMC mode, and the MIMO mid-amble area 318-3.

Further, the UL burst areas of the UL sub-frame 307 include a UL burst area 324-1 allocated for a MIMO mode, a typical UL burst area 314-2 and a UL burst area 324-3 allocated for a band AMC mode.

Further, the second frame 303 includes a MAP header area 330, a plurality of MAP areas 332-1, 332-2, 332-3 and 332-4, and DL burst areas. The second frame 303 does not include a preamble area.

The DL burst areas include a DL burst area 334-1 allocated for a diversity mode, a DL burst area 334-2 allocated for a band AMC mode, a diversity Single-Input Single-Output (SISO) area 334-3 allocated for a SISO diversity mode and a MIMO mid-amble area 334-4.

The MIMO mid-amble area 334-4 corresponds to an area used for obtaining channel information on all of the bands for all users for satisfactory operation of the MIMO mode. Further, the MIMO mid-amble area 334-4 has a tile structure, which will be described in more detail below with reference to FIG. 4.

Further, the DL burst area 334-3 of the second frame 303 is allocated for the diversity SISO mode. The DL burst area 334-3 allocated for the diversity SISO mode is used for only the diversity and the SISO transmission technique.

Figure 4:
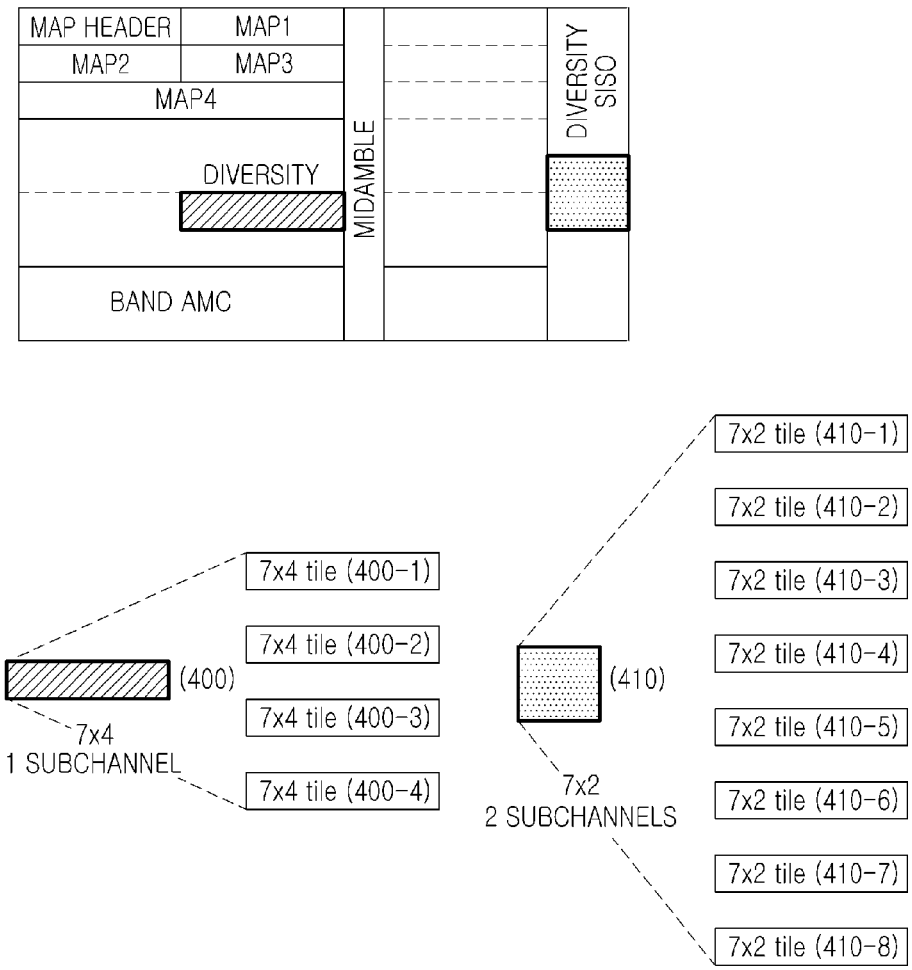
FIG. 4 illustrates a structure of a DL sub-frame in a communication system according to an exemplary embodiment of the present invention.

FIG. 4 illustrates a structure of a DL sub-frame in a communication system according to an exemplary embodiment of the present invention.

Referring to FIG. 4, the DL sub-frame includes a 7×4 tile structure 400. Further, one sub-channel includes four 7×4 tiles 400-1, 400-2, 400-3 and 400-4, with each of the 7×4 tile including four pilot tones and 24 data tones. Therefore, one sub-channel includes 96 data tones. That is, the sub-channel is allocated four OFDM symbols by four OFDM symbols. An area configured by the 7×4 tiles is defined as a DL normal sub-channel. The DL normal sub-channel includes DL burst areas allocated for SISO, MIMO, diversity and band AMC modes.

Meanwhile, the area allocated for a diversity SISO mode within the DL sub-frame includes a 7×2 tile structure 410, because the number of symbols in the first frame of the DL sub-frame is different from the number of symbols in the other frames. In the first frame, there are 2 additional symbols that are used for a preamble area and a BCH area that are not used in subsequent frames. Therefore, in the second frame, only 2 symbols can be used. The 2 symbol area of the second frame is used as an area allocated for the diversity SISO mode. The area allocated for the diversity SISO mode constitutes two sub-channels including eight 7×2 tiles 410-1, 410-2, 410-3, 410-4, 410-5, 410-6, 410-7, and 410-8.

Figure 5:
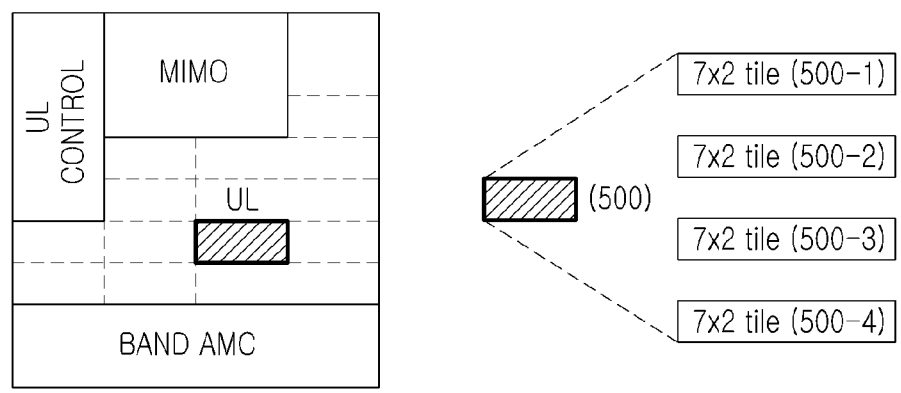
FIG. 5 illustrates a structure of a UL sub-frame in a communication system according to an exemplary embodiment of the present invention.

FIG. 5 illustrates a structure of a UL sub-frame in a communication system according to an exemplary embodiment of the present invention.

Referring to FIG. 5, the UL sub-frame has a 7×2 tile structure 500. Further, one sub-channel includes four 7×2 tiles 500-1, 500-2, 500-3 and 500-4, and each of the 7×2 tiled includes two pilot tones and 12 data tones. Therefore, one sub-channel includes 48 data tones.

Figure 6:
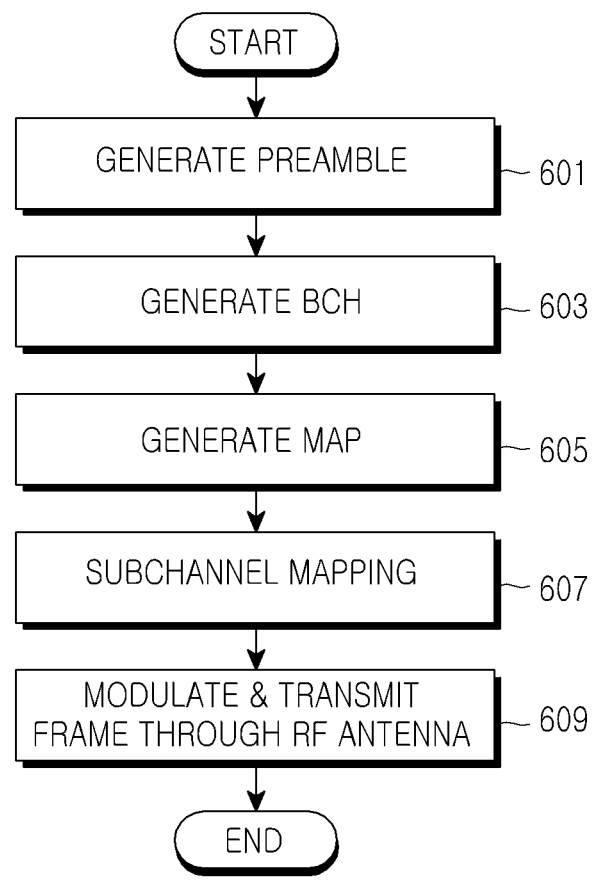
FIG. 6 is a flow diagram illustrating a process of generating a frame by a base station in a communication system according to an exemplary embodiment of the present invention.

FIG. 6 is a flow diagram illustrating a process of generating a frame by a base station in a communication system according to an exemplary embodiment of the present invention.

Referring to FIG. 6, the base station generates a preamble signal used for the acquisition of synchronization between mobile stations in step 601. Then, in step 603, the base station generates a BCH based on system information, such as a ratio between DL areas and UL areas and an allocation ratio between diversity areas and band AMC areas.

Then, in step 605, the base station generates a MAP based on the systems information and Channel Quality Indication (CQI) information. In step 607, the base station performs burst area mapping, that is, sub-channel mapping. In other words, the base station maps the areas allocated for the diversity and band AMC modes, that is, sub-channel areas allocated for the SISO and MIMO modes. In step 609, the base station modulates and transmits the generated frame.

Figure 7:
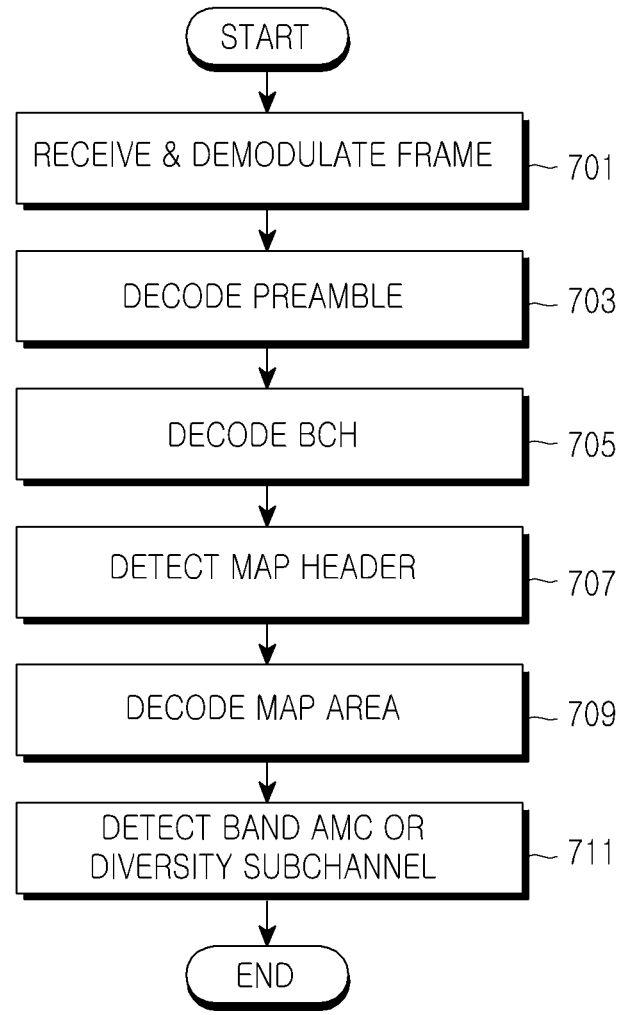
FIG. 7 is a flow diagram illustrating a process of frame decoding by a mobile station in a communication system according to an exemplary embodiment of the present invention.

FIG. 7 is a flow diagram illustrating a process of frame decoding by a mobile station in a communication system according to an exemplary embodiment of the present invention.

Referring to FIG. 7, in step 701, the mobile station receives a frame transmitted by the base station and demodulates the frame according to a demodulation scheme corresponding to a modulation scheme applied by the base station. In step 703, the mobile station decodes a preamble signal included in the preamble area of the frame. By using the decoded preamble signal, the mobile station can acquire synchronization with the base station and can identify a base station identifier or a sector identifier. Then, in step 705, the mobile station decodes the BCH area, thereby obtaining system information, such as a ratio between DL areas and UL area and an allocation ratio between diversity areas and band AMC areas.

In step 707, the mobile station decodes the MAP header area, thereby obtaining the MAP size information and the MCS level information of the MAPs. In step 709, the mobile station decodes the MAP area, thereby acquiring burst allocation information. In step 711, based on the information acquired from the MAP area, the mobile station detects the burst area allocated for the diversity mode or the burst area allocated for the band AMC mode, and then terminates the process.

A structure of the base station and the mobile station described above will be described below with reference to FIGS. 8 and 9.

Figure 8:
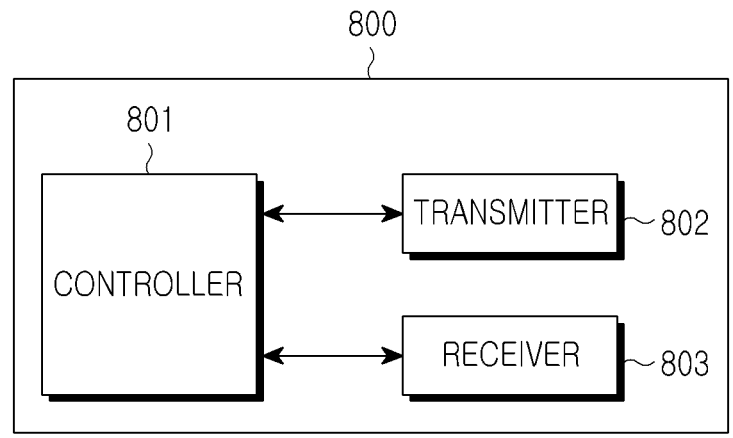
FIG. 8 illustrates a structure of a base station in a communication system according to an exemplary embodiment of the present invention.

FIG. 8 illustrates a structure of a base station in a communication system according to an exemplary embodiment of the present invention.

Referring to FIG. 8, a base station 800 includes a controller 801, a transmitter 802, and a receiver 803.

The base station 800 performs the operations explicitly, implicitly, or inherently described above as being performed by a base station. To do so, the base station 800 may utilize the controller 801, the transmitter 802, and the receiver 803. The controller 801 controls the overall operation of the base station 800, and especially generates and/or processes signals corresponding to the multi-frame structure described above. The transmitter 802 sends various signals generated by the controller 801 to a mobile station under the control of the controller 801. The receiver 803 receives various signals from the mobile station under the control of the controller 801. Although the controller 801, the transmitter 802, and the receiver 803 are realized as individual components in the example of FIG. 8, it will be understood by those of ordinary skill in the art that they may be realized in a single or a different number of components.

Figure 9:
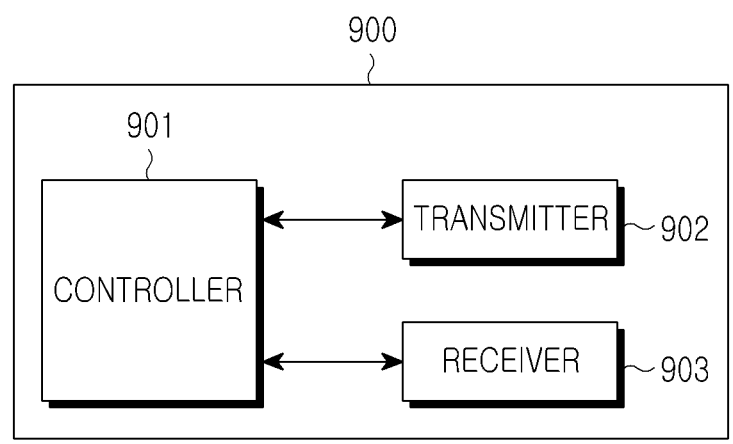
FIG. 9 illustrates a structure of a mobile station in a communication system according to an exemplary embodiment of the present invention.

FIG. 9 illustrates a structure of a mobile station in a communication system according to an exemplary embodiment of the present invention.

Referring to FIG. 9, a mobile station 900 includes a controller 901, a transmitter 902, and a receiver 903.

The mobile station 900 performs the operations explicitly, implicitly, or inherently described above as being performed by a mobile station. To do so, the mobile station 900 may utilize the controller 901, the transmitter 902, and the receiver 903. The controller 901 controls the overall operation of the mobile station 900, and especially generates and/or processes signals corresponding to the multi-frame structure described above. The transmitter 902 sends various signals generated by the controller 901 to a base station station under the control of the controller 901. The receiver 903 receives various signals from the base station under the control of the controller 901. Although the controller 901, the transmitter 902, and the receiver 903 are realized as individual components in the example of FIG. 9, it will be understood by those of ordinary skill in the art that they may be realized in a single or a different number of components.

As described above, the multi-frame structure proposed by the exemplary embodiments of the present invention has an overhead that is lower than that of a conventional frame and has a minimum frame length shorter than that of a conventional frame, thereby reducing feedback delay and increasing system throughput. Further, the exemplary embodiments of the present invention can support various transmission techniques by configuring burst areas within the multi-frame into a single zone. As a result, exemplary embodiments of the present invention can reduce additional overhead occurrence.

While the invention has been shown and described with reference to certain exemplary embodiments thereof, it will be understood by those skilled in the art that various changes in form and details may be made therein without departing from the spirit and scope of the invention as defined by the appended claims and their equivalents

What is claimed is:

1. A method for at least one of transmitting and receiving a signal in a communication system, the method comprising:
at least one of transmitting and receiving a signal using a multiframe,
wherein the multiframe includes at least two frames including a first frame and a second frame, and each of the at least two frames includes a downlink subframe and an uplink subframe,
wherein a downlink subframe included in the first frame includes a first region, a second region, a third region and a fourth region, and an uplink subframe included in the first frame includes a fifth region and a sixth region,
wherein a preamble signal is transmitted through the first region,
wherein system information and common control information related to the multiframe is transmitted through the second region,
wherein a downlink data burst to which a distributed resource mode is adapted is transmitted through the third region,
wherein a downlink data burst to which a contiguous resource mode is adapted is transmitted through the fourth region,
wherein an uplink burst to which the distributed resource mode is adapted is received through the fifth region,
wherein an uplink data burst to which the contiguous resource mode is adapted is received through the sixth region,
wherein the third region is distinguished from the fourth region using a frequency band,
wherein the third region and the fourth region are located in a same time interval, and
wherein a downlink subframe included in the second frame does not include the second region.

2. The method of claim 1, wherein the downlink subframe included in the second frame does not include the first region.

3. The method of claim 1, wherein the downlink subframe included in the first frame includes a seventh region and an eighth region,
wherein a midamble signal is transmitted through the seventh region, and
wherein MAP information is transmitted through the eighth region.

4. The method of claim 1, wherein, if a number of frames included in the multiframe is 8, a length of each of the 8 frames is 2.5 ms.

5. The method of claim 1, wherein, if a number of frames included in the multiframe is 4, a length of each of the 4 frames is 5 ms.

6. The method of claim 1, wherein a downlink subframe of only one of the at least two frames includes a ninth region, and the downlink subframe of one of the at least two frames does not include the first region and the second region, and
wherein a downlink data burst to which a Single Input Single Output (SISO) mode is adapted is transmitted through the ninth region.

7. A method for at least one of transmitting and receiving a signal in a communication system, the method comprising:
at least one of transmitting and receiving a signal using a multiframe, wherein the multiframe includes at least two frames including a first frame and a second frame, and each of the at least two frames includes a downlink subframe and an uplink subframe, wherein a downlink subframe included in the first frame includes a first region, a second region, a third region and a fourth region, and an uplink subframe included in the first frame includes a fifth region and a sixth region, wherein a preamble signal is received through the first region, wherein system information and common control information related to the multiframe is received through the second region, wherein a downlink data burst to which a distributed resource mode is adapted is received through the third region, wherein a downlink data burst to which a contiguous resource mode is adapted is received through the fourth region, wherein an uplink burst to which the distributed resource mode is adapted is transmitted through the fifth region, wherein an uplink data burst to which the contiguous resource mode is adapted is transmitted through the sixth region, wherein the third region is distinguished from the fourth region using a frequency band, wherein the third region and the fourth region are located in a same time interval, and wherein a downlink subframe included in the second frame does not include the second region.

8. The method of claim 7, wherein the downlink subframe included in the second frame does not include the first region.

9. The method of claim 7, wherein the downlink subframe included in the first frame includes a seventh region and an eighth region, wherein a midamble signal is received through the seventh region, and wherein MAP information is received through the eighth region.

10. The method of claim 7, wherein, if a number of frames included in the multiframe is 8, a length of each of the 8 frames is 2.5 ms.

11. The method of claim 7, wherein, if a number of frames included in the multiframe is 4, a length of each of the 4 frames is 5ms.

12. The method of claim 7, wherein a downlink subframe of only one of the at least two frames includes a ninth region, and the downlink subframe of one of the at least two frames does not include the first region and the second region, and wherein a downlink data burst to which a Single Input Single Output (SISO) mode is adapted is transmitted through the ninth region.

13. A base station in a communication system, the base station comprising:

a transmitter for transmitting a signal using a multiframe; and a receiver for receiving a signal using the multiframe, wherein the multiframe includes at least two frames including a first frame and a second frame, and each of the at least two frames includes a downlink subframe and an uplink subframe, wherein a downlink subframe included in the first frame includes a first region, a second region, a third region and a fourth region, and an uplink subframe included in the first frame includes a fifth region and a sixth region, wherein a preamble signal is transmitted through the first region, wherein system information and common control information related to the multiframe is transmitted through the second region, wherein a downlink data burst to which a distributed resource mode is adapted is transmitted through the third region, wherein a downlink data burst to which a contiguous resource mode is adapted is transmitted through the fourth region, wherein an uplink burst to which the distributed resource mode is adapted is received through the fifth region, wherein an uplink data burst to which the contiguous resource mode is adapted is received through the sixth region, wherein the third region is distinguished from the fourth region using a frequency band, wherein the third region and the fourth region are located in a same time interval, and wherein a downlink subframe included in the second frame does not include the second region.

14. The base station of claim 13, wherein the downlink subframe included in the second frame does not include the first region.

15. The base station of claim 13, wherein the downlink subframe included in the first frame includes a seventh region and an eighth region, wherein a midamble signal is transmitted through the seventh region, and wherein MAP information is transmitted through the eighth region.

16. The base station of claim 13, wherein, if a number of frames included in the multiframe is 8, a length of each of the 8 frames is 2.5 ms.

17. The base station of claim 13, wherein, if a number of frames included in the multiframe is 4, a length of each of the 4 frames is 5 ms.

18. The base station of claim 13, wherein a downlink subframe of only one of the at least two frames includes a ninth region, and the downlink subframe of one of the at least two frames does not include the first region and the second region, and wherein a downlink data burst to which a Single Input Single Output (SISO) mode is adapted is transmitted through the ninth region.

19. A mobile station in a communication system, the mobile station comprising:

a transmitter for transmitting a signal using a multiframe; and a receiver for receiving a signal using the multiframe, wherein the multiframe includes at least two frames including a first frame and a second frame, and each of the at least two frames includes a downlink subframe and an uplink subframe, wherein a downlink subframe included in the first frame includes a first region, a second region, a third region and a fourth region, and an uplink subframe included in the first frame includes a fifth region and a sixth region, wherein a preamble signal is received through the first region, wherein system information and common control information related to the multiframe is received through the second region, wherein a downlink data burst to which a distributed resource mode is adapted is received through the third region, wherein a downlink data burst to which a contiguous resource mode is adapted is received through the fourth region, wherein an uplink burst to which the distributed resource mode is adapted is transmitted through the fifth region, wherein an uplink data burst to which the contiguous resource mode is adapted is transmitted through the sixth region, wherein the third region is distinguished from the fourth region using a frequency band, wherein the third region and the fourth region are located in a same time interval, and wherein a downlink subframe included in the second frame does not include the second region.

20. The mobile station of claim 19, wherein the downlink subframe included in the second frame does not include the first region and the second region.

21. The mobile station of claim 19, wherein the downlink subframe included in the first frame includes a seventh region and an eighth region, wherein a midamble signal is received through the seventh region, and wherein MAP information is received through the eighth region.

22. The mobile station of claim 19, wherein, if a number of frames included in the multiframe is 8, a length of each of the 8 frames is 2.5 ms.

23. The mobile station of claim 19, wherein, if a number of frames included in the multiframe is 4, a length of each of the 4 frames is 5 ms.

24. The mobile station of claim 19, wherein a downlink subframe of only one of the at least two frames includes a ninth region, and the downlink subframe of one of the at least two frames does not include the first region and the second region, and wherein a downlink data burst to which a Single Input Single Output (SISO) mode is adapted is transmitted through the ninth region.

* * * * *